Sept. 9, 1958 M. C. ELRICK ET AL 2,850,768
COLLAPSIBLE CURING RIM
Filed Sept. 17, 1953
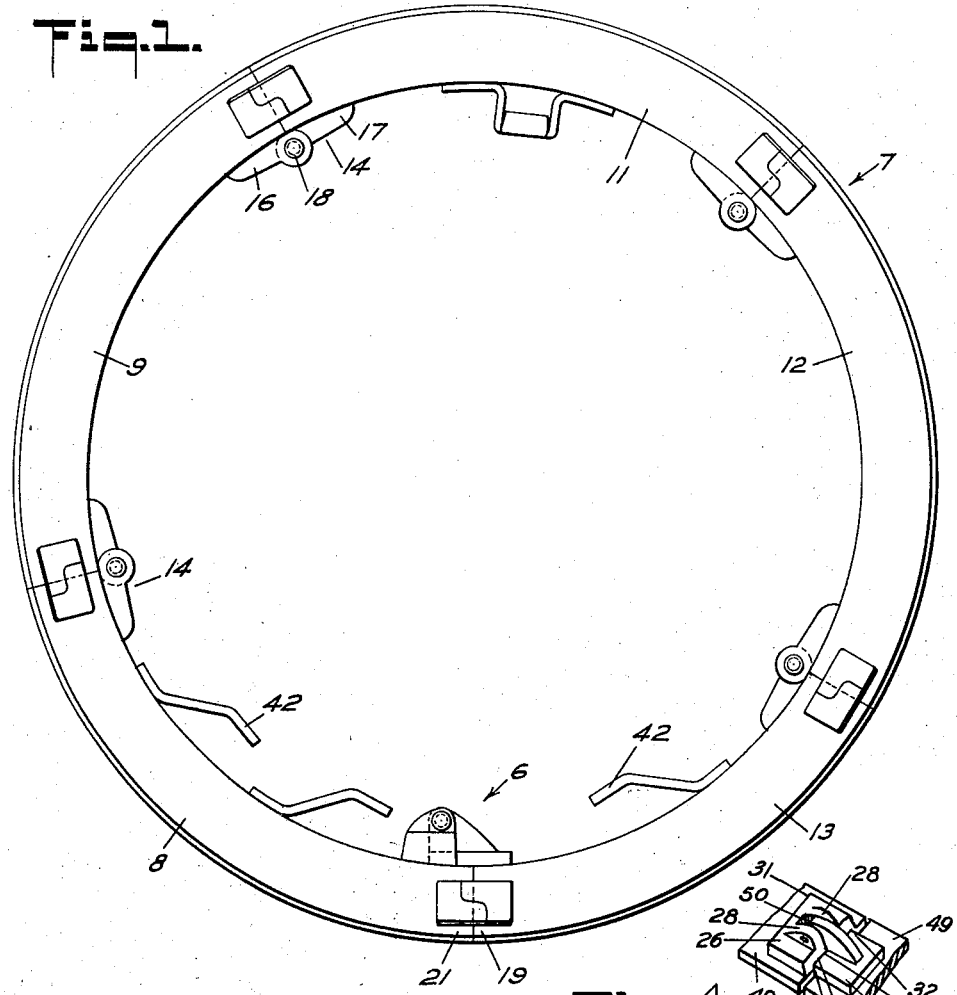
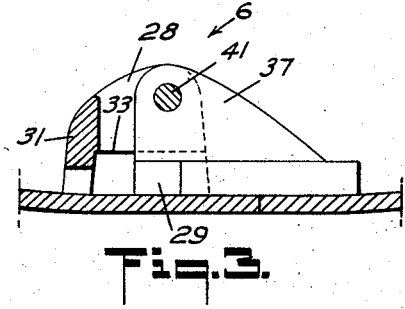
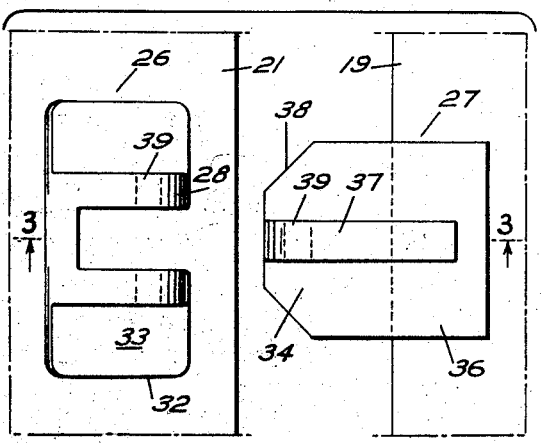
INVENTORS
MALCOLM C. ELRICK &
MARCUS B. CHAMPLIN
BY
ATTORNEYS

United States Patent Office 2,850,768
Patented Sept. 9, 1958

2,850,768

COLLAPSIBLE CURING RIM

Malcolm C. Elrick and Marcus B. Champlin, Hayward, Calif.

Application September 17, 1953, Serial No. 380,752

1 Claim. (Cl. 18—45)

This invention relates to apparatus utilized in the retreading or recapping of tires, and more particularly to a collapsible curing rim on which the tire is placed during the recapping or retreading operation.

For many years curing rims having a plurality of arcuate segments which can be expanded to provide a continuous rim for a tire have been utilized by the trade. In general, the individual segments of such devices have been hingedly connected to adjacent segments whereby the entire unit could be collapsed and subsequently expanded to receive the tire and conventional air bag. While such devices have achieved a relatively wide-spread acceptance by the trade, the prior art devices had a shortcoming in that the connection for maintaining the rim in its expanded condition, conventionally located at the opposed end portions of the end segments, did not provide any satisfactory lock to prevent collapse of the rim in the event of blowing out of the air bag or when other abnormal forces were applied thereto.

Accordingly, it is an object of the present invention to provide a collapsible rim of the type described in which means are provided for positively maintaining the rim segments so as to provide a continuous circular form for receiving a tire.

Another object of our invention is to provide a rim of the character described including improved locking means capable of resisting abnormal lateral and circumferential strains imposed thereon, thereby eliminating the danger of the rim collapsing during the tire retreading or recapping operation.

A further object of our invention is to provide locking means as above mentioned in which means are provided for accurately guiding the end rim segments in position.

A still further object of the invention is to provide the above referred to locking means disposed on the inner peripheral surface of a collapsible rim so as not to interfere with the placing of the tire or high-pressure air bag adjacent the outer periphery thereof.

Yet another object of the invention is to provide apparatus of the character described which is economical to construct, simple to operate, and which presents no maintenance difficulties.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claim.

Referring to said drawing:

Figure 1 is a side elevational view of the rim of the present invention shown in operative tire-receiving position.

Figure 2 is a top plan view of the locking mechanism shown in Figure 1, but with the segments on which the locking means are provided shown in detached condition.

Figure 3 is a cross-sectional elevational view taken substantially in the plan indicated by line 3—3 of Figure 2, but with the parts shown in their engaged or operative condition.

Figure 4 is a fragmentary isometric view of the locking mechanism.

The locking means of the present invention generally indicated by the numeral 6 in the drawing is here shown in connection with a collapsible rim 7. The rim 7 may be of any conventional form, and as here indicated includes a plurality of segments 8, 9, 11, 12 and 13. Each of such segments have an outer dished surface and being of arcuate form as will be noted, and for a purpose to be presently described, the segment 13 is shorter than the other segments.

In order that the rim 7 may be collapsed to permit the installation of a tire thereon, a plurality of hinges 14 are provided at the ends of the respective segments. Such hinges may be of any desired type or form, but are illustrated as including a pair of lugs 16 mounted at one end of each segment and matching lugs 17 mounted at the opposed end of each segment. These pairs of lugs are suitably apertured to receive a pin 18 for hingedly connecting the segments together. As will be understood, the end portion 19 of end segment 13 and the end portion 21 of end segment 8 do not have any hinge connection, and in this manner the entire rim may be readily collapsed for the purpose above mentioned.

If desired, to insure greater stability of the rim when in its operative position, each of the rim segments may include an L-shaped lug adjacent the outer edge thereof with one leg of the L extending beyond the end of the particular segment but having the extending lugs of the co-operating legs offset, when the rim is in its operative position, the respective legs will intermesh and tend to resist lateral movement of the segments relative to each other. In accordance with the teachings of the present invention, means are provided for positively maintaining the rim in its expanded position. Such means, generally identified by the numeral 6, are mounted on the end portions 19 and 21 of the segments 13 and 8, and when placed in operative position insure against inward or lateral displacement of such segments. In this manner, even if a severe impact load is imparted to the rim, the latter will maintain its circular shape and will not be subject to breakage, and there will be no danger of injury to personnel working in the neighborhood of the rim.

Referring particularly to Figures 2 and 3 of the drawing, the lock means 6 include a socket or female member 26 providing a circumferential opening and a plug or male member 27. Although the member 27 is indicated in the drawing as being affixed to the inner periphery of the segment 13, it will be apparent that the members 26 and 27 could be reversed on the respective end portions of the segments 8 and 13. The female member 26 includes a rear wall 31, side walls 32, and a top wall 33, the said top wall being radially inwardly disposed relative to the inner periphery and having a central opening divided in part by a pair of parallel spaced vertically extending lugs 28. The member is further provided with a longitudinally extending socket or recess 29 which overlies the inner peripheral surface of end portion 21 and is arranged to receive a tongue of member 27, as will be presently explained. It is important to note that the leading edge surface of the lugs and the top and side wall portions of member 26 are disposed slightly rearwardly of the end of section 8, and it will be likewise noted that the locking members are each disposed along the longitudinal centerlines of their respective rim segments.

With reference to locking member 27, it will be seen that it comprises a relatively flat plate 36 having a centrally disposed and vertically extending lug 37 mounted thereon. The plate 36 is welded or otherwise secured to the segment 13 with the distal end portion or tongue 34 thereof extending beyond the end of the segment. In this manner, it should be clear that when the segments 8 and 13 are brought into abutting relation, the tongue 34 of member 27 will slide within the recess of socket 29, and by virtue of the top wall of member 26 overlying the side portions of the tongue, inward collapsing of the rim segments is effectively prevented. If desired the corners of the tongue may be angularly cut as indicated at 38 so as to assist in guiding the tongue within the aforementioned socket.

With the tongue disposed in the recess in the manner just described, it will be further noted that the lug 37 slides between the lugs 28 on the complementary locking member by providing aligned apertures 39 on the respective lugs. A pin 41 may be introduced through the apertures to serve as circumferential locking means and prevent relative outward movement of the segments 8 and 13 thus, with the combination of the tongue and socket arrangement, together with the interfitting lug arrangement, the segments 8 and 13 are positively restrained from movement in any direction and the true circular shape of the rim is insured.

In order to permit the separation of the lock members, a plurality of elements 42 are provided on the rim segments 8 and 13. These elements are designed to receive a conventional rim collapsing tool which effects a slight deformation of the rim and the separation of the end rim segments. In practice, when the rim is in its collapsed condition, the segments 8 through 12 are first placed in a continuous arcuate form, the tool inserted in the elements 42 so as to force the end portions of segments 8 and 13 to be brought into abutting relationship and the lock means will function as above described. The shorter segment 13 permits a more ready collapsing or assembling of the respective segments.

From the foregoing description, both the details of construction and method of operation of the apparatus should be clear. It will be appreciated that the locking members are made of relatively heavy gauge metal, approximately ¼" in thickness, so as to be capable of performing their requisite functions.

We claim:

In a collapsible rim device having an inner periphery defined by a plurality of arcuate rim segments exceeding two hingedly connected for opening and closing in the general plane of said rim with the end segments thereof having free distal end portions, latch means for releasably securing said end segments together so as to define with the other of said segments a continuous circular rim, said means including a first member rigidly secured to one of said end segments having side walls and a top wall radially inwardly disposed relative to said inner periphery to define therewith a socket providing a circumferential opening of rectangular cross section, said end segment extending circumferentially beyond said side and top walls, a second member rigidly secured to the other of said end segments and having a plug of rectangular cross section provided with a transversely convergent end extending beyond the end of its associated segment slidable circumferentially into said socket for engagement with said side walls, and restrained against relative radial and transverse movement by said walls and periphery, said latch means including a circumferential locking means comprising a slot in said top wall and an inwardly directed radial projection on said plug received by said slot under assembled conditions of said rim device, said plug and socket containing transverse openings in registry under assembled conditions of said rim device for reception of a locking element.

References Cited in the file of this patent
UNITED STATES PATENTS

| | | |
|---|---|---|
| 496,321 | Morgan et al. | Apr. 25, 1893 |
| 497,464 | Welch | May 16, 1893 |
| 812,148 | McConnell et al. | Feb. 6, 1906 |
| 1,320,199 | Camp | Oct. 28, 1919 |
| 1,368,862 | Traum | Feb. 15, 1921 |
| 1,788,428 | Garabiol | Jan. 13, 1931 |
| 1,938,437 | O'Brien | Dec. 5, 1933 |
| 2,152,765 | Kite et al. | Apr. 4, 1939 |
| 2,372,246 | Bacon | Mar. 27, 1945 |
| 2,561,573 | Hovlid et al. | July 24, 1951 |
| 2,724,861 | Cox | Nov. 29, 1955 |